United States Patent
Melkonian

(10) Patent No.: US 9,896,879 B2
(45) Date of Patent: Feb. 20, 2018

(54) INTEGRATED INSULATION EXTRUSION AND EXTRUSION TECHNOLOGY FOR WINDOW AND DOOR SYSTEMS

(71) Applicant: Mikron Industries, Inc., Kent, WA (US)

(72) Inventor: George Melkonian, Federal Way, WA (US)

( * ) Notice: Subject to any disclaimer, the term of this patent is extended or adjusted under 35 U.S.C. 154(b) by 4 days.

(21) Appl. No.: 15/208,420

(22) Filed: Jul. 12, 2016

(65) Prior Publication Data

US 2017/0037673 A1 Feb. 9, 2017

Related U.S. Application Data

(60) Continuation of application No. 14/145,160, filed on Dec. 31, 2013, now abandoned, which is a division of
(Continued)

(51) Int. Cl.
| | |
|---|---|
| *E06B 3/24* | (2006.01) |
| *B29C 44/32* | (2006.01) |
| *B29C 47/00* | (2006.01) |
| *B29C 47/06* | (2006.01) |
| *B29C 47/10* | (2006.01) |
| *B29C 47/26* | (2006.01) |
| *B29C 47/50* | (2006.01) |
| *B29C 47/90* | (2006.01) |
| *B29C 71/02* | (2006.01) |

(Continued)

(52) U.S. Cl.
CPC ............. *E06B 3/24* (2013.01); *B29C 44/324* (2013.01); *B29C 47/003* (2013.01); *B29C 47/0023* (2013.01); *B29C 47/0028* (2013.01); *B29C 47/0042* (2013.01); *B29C 47/065* (2013.01); *B29C 47/1045* (2013.01); *B29C 47/1081* (2013.01); *B29C 47/263* (2013.01); *B29C 47/38* (2013.01); *B29C 47/50* (2013.01); *B29C 47/8835* (2013.01); *B29C 47/903* (2013.01); *B29C 71/02* (2013.01); *E06B 1/36* (2013.01); *E06B 3/26301* (2013.01); *E06B 3/26345* (2013.01); *E06B 3/5454* (2013.01); *E06B 3/663* (2013.01); *B29C 35/045* (2013.01); *B29C 47/0066* (2013.01); *B29C 47/10* (2013.01); *B29C 47/34* (2013.01); *B29C 2035/0822* (2013.01); *B29C 2071/022* (2013.01); *B29C 2793/0027* (2013.01); *B29K 2027/06* (2013.01); *B29K 2105/04* (2013.01); *B29K 2105/16* (2013.01); *B29K 2509/02* (2013.01); *B29K 2995/0015* (2013.01); *B29L 2031/003* (2013.01); *B29L 2031/608* (2013.01); *E06B 2003/262* (2013.01); *E06B 2003/26321* (2013.01); *Y02B 80/28* (2013.01); *Y10T 428/1376* (2015.01); *Y10T 428/249991* (2015.04); *Y10T 428/249992* (2015.04)

(58) Field of Classification Search
CPC ............ B29C 47/0042; B29C 47/0005; B29C 47/005; B29C 47/0052; B29C 47/04; B29C 47/56; B29C 47/366; B29C 47/266; B29C 47/261; B29C 47/26; B29C 47/30
See application file for complete search history.

*Primary Examiner* — Stella K Yi
(74) *Attorney, Agent, or Firm* — Zollinger & Burleson Ltd.

(57) ABSTRACT

Extruded plastic profiles with integrated insulation, the method for extruding such products, and the windows and doors made with such plastic extrusions. The plastic extrusions may additionally include a low heat build-up capstock system comprising an acrylic cap and pigment system that is substantially IR transparent. The extruded plastic profiles with integrated insulation are recyclable using conventional plastic extrusion process and are fully weldable in conventional window and door manufacturing.

11 Claims, 5 Drawing Sheets

Related U.S. Application Data application No. 12/592,277, filed on Nov. 21, 2009, now Pat. No. 8,632,868.

(51) Int. Cl.
E06B 1/36 (2006.01)
B29C 47/38 (2006.01)
E06B 3/263 (2006.01)
B29C 47/88 (2006.01)
E06B 3/54 (2006.01)
E06B 3/663 (2006.01)
B29C 35/04 (2006.01)
B29C 47/34 (2006.01)
B29C 35/08 (2006.01)
B29K 105/04 (2006.01)
B29L 31/00 (2006.01)
B29L 31/60 (2006.01)
B29K 105/16 (2006.01)
B29K 27/06 (2006.01)
B29K 509/02 (2006.01)
E06B 3/26 (2006.01)

INTEGRATED INSULATION EXTRUSION AND EXTRUSION TECHNOLOGY FOR WINDOW AND DOOR SYSTEMS

CROSS REFERENCE TO RELATED APPLICATIONS

This application is a continuation of U.S. patent application Ser. No. 14/145,160 filed Dec. 31, 2013, which is a divisional application claiming priority to U.S. patent application Ser. No. 12/592,277 filed Nov. 21, 2009; U.S. Pat. No. 8,632,868 granted Jan. 14, 2014; the disclosures of each are incorporated herein by reference.

BACKGROUND OF THE INVENTION

1. Technical Field

The invention concerns extruded plastic profiles with integrated insulation and the method and apparatus for extruding such products.

2. Background Information

Milled wood products have formed the foundation for the fenestration, decking, venetian blinds, shutters, decking and remodeling industries for many years. Historically, ponderosa pine, fir, red wood, cedar and other coniferous varieties of soft woods have been employed with respect to the manufacture of residential window frames, residential door frames, residential siding, outer decking and exterior shutters as well as interior venetian blinds and shutters. Wood products of this type inherently possess the advantageous characteristics of high flexural modulus, good screw retention, easy workability (e.g., milling, cutting), easy paintability, and for many years, low cost. Conversely, wood products of this type have also suffered from poor weatherability in harsh climates, potential insect infestation such as by termites, and high thermal conductivity. In addition, virgin wood resources have become scarce causing correspondingly high material costs.

Alternatively, various metals, especially extruded aluminum, have been used and continue to be used as residential window and door frames in addition to commercial window and door frames. Metal products of this type inherently possess the advantageous characteristics of high flexural modulus and easy paintability, but also suffer from high thermal conductivity.

The high thermal conductivity of both milled wood products and extruded aluminum have become particularly disadvantageous for the window and door products of the fenestration industry. Due to increasing energy costs and increased awareness and concern over energy usage in residential housing, there is governmental regulatory pressure from building codes, product certification requirements, incentive programs subsidizing the purchase of thermally efficient residential housing windows and door products, and general market demand for ever more thermally efficient windows and door products.

In response to the above described disadvantages of milled wood products and metal products, the fenestration industry, in particular, adopted polyvinyl chloride (PVC) as a raw material. Hollow, lineal extrusions manufactured into window frames became an enormous success, particularly at the lower end of the price spectrum. The window frames and sashes made from hollow PVC lineals (often referred to as "vinyl windows") have exhibited superior thermal conductivity compared to painted ponderosa pine window or extruded aluminum. Further, foamed polymer solid extrusions have been used to replace wood window frames and sashes. The foamed polymer extrusions may contain organic or inorganic fillers, such as wood flour and talc, respectively, where advantageous for improved physical properties such as stiffness and/or to reduce the cost of the extrusions.

Due to the high thermal conductivity of extruded aluminum window and door frames, and even to further improve the thermal performance of vinyl windows and doors formed from hollow PVC lineals, the fenestration industry has inserted foam insulation into the hollow interior portions of the extrusions. This insulation can significantly improve the thermal performance of a window or door frame, and therefore improve the thermal performance of the entire window, by reducing the free air within an interior pocket or chamber of the hollow extrusion. This free air within a chamber of the extrusion can cause significant heat transfer through the walls of the extrusion due to the temperature difference between the inside and outside walls of the extrusion causing the air to cycle around in the cavity causing convective heat loss in the associated window. The insulation within hollow can reduce or eliminate this convection heat transfer. The determination of which pocket or chamber within the window or door frame extrusion would see the most benefit from such insulation is dependent on the particular shape of the window extrusion and window and is determined on a case-by-case basis based on thermal simulations or sample testing.

One commonly used prior art foam insulation is a low density block polystyrene based foam, often referred to as Styrofoam, which is cut or otherwise dimensioned to fit within the desired pocket or chamber within the window or door frame extrusion. Such a polystyrene block will insulate well should it substantially fill the chamber, but achieving this proper fit is the significant disadvantage. Rarely are the pockets or chambers within the window or door frame extrusion a standard or regular size, so that usually the polystyrene will have to be cut down from a block or sheet causing scraps and wasted insulation. Inserting the polystyrene insulation into the pocket or chamber within the window or door frame extrusion can be difficult if the clearance between the exterior of the polystyrene insulation and the chamber are too tight, but too large air gaps between insulation and extrusion will diminish the thermal performance. Thus, this can be a significantly labor intensive and costly process.

A second prior art foam insulation is a low density, CFC free, semi-rigid polyurethane foam. This is typically an in-place foam process that uses equipment to mix two ingredients together where this mixture is then injected and expands within the chamber to be insulated. An example of this prior art foam insulation is FOAMSEAL® P12844/FSA sold by Futura Coatings of St. Louis, Mo. This process is another process step for a window or door manufacturer which adds labor costs. Further, both the polystyrene foam and the polyurethane foam are separate materials from either the extruded aluminum or the PVC lineals that make up the window frames making it more difficult to recycle the base materials.

As above, an advantage of windows manufactured with wooden frames and sashes is that they can easily be stained or painted virtually any color. Thus, the color of the window frame and sash could be chosen to accent or contrast with the color of the exterior of the house. The prior art PVC products are typically available only in white or beige or other colors that do not readily absorb in the IR spectrum and therefore do not build up sufficient heat to distort the body of the extrusion. Typically, these mono-color extrusions are seen in lighter shades and pastels where heat build-up is not a problem and where the required amount of pigments does not unduly increase the cost of the extrusion.

Understandably, window and door profiles in dark colors, such as "Hunter Green" and "Bronze," have long been demanded in the industry and available in wood or extruded aluminum which has been a significant market advantage of such products. When referring to dark colors herein, the inventor is referring generally to colors with an Lh value between 13 and 40. For example, per ASTM 4726-02, dark brown is defined as a color with an Lh between 13 and 33, an ah between −1.0 and 6.0 and a bh between 1.0 and 6.5. Per AAMA 308-02, dark green is defined as a color with an Lh between 20 and 40, and ah between −20 and −2 and a bh between −2.0 and 4.0. The inventor defines the color red to have Lh values between 20 and 30, ah values between 13 and 23, and bh values between 6 and 12.

Applying a thin capstock layer to hollow vinyl profiles and solid foamed polymer resin extrusions is well known in the art. Typically, the capstock layer is applied for the purpose of achieving color, weatherability, and certain appearance attributes in a cost-effective manner. Frequently, this allows the practitioner to use a lower-cost material in the substrate and therefore reduces total product cost. However, in the past, the useful color spectrum that can be applied to PVC hollow or foamed profile extrusion is limited to colors and pigment systems that do not build up excessive heat and thereby cause the body of the product to distort.

Assignee of this application has been assigned co-pending U.S. patent application Ser. No. 11/291,494 entitled "Low Heat Build-up Capstock System and Extrusion Technology for Solid and Foamed Profiles in Dark Colors" which allows the production of a dark colored capstock that is significantly NIR transparent rather than NIR reflective, and relies on an NIR reflective substrate for the NIR reflectance and allows a dark colored capstock on hollow PVC extrusion. Disclosure of that application is incorporated herein by reference.

SUMMARY OF THE INVENTION

It is therefore an object of the invention to provide an extrudate with integral foam insulation. This inventive extrudate comprises a structural extrusion formed of a first thermoplastic resin suitable for use in the fenestration industry, contains at least one hollow interior portion and has a constant profile and extends to an indefinite length. An integrated insulation formed of a second thermoplastic resin substantially fills a hollow portion of the structural extrusion and, in a preferred embodiment, this integrated insulation is foamed and formed so that this foam further contains a plurality of air pockets running in the length of the extrudate. The first thermoplastic resin and the second thermoplastic resin are compatible and recyclable together and the structural extrusion and the integrated insulation are coextruded through an extrusion die to form the inventive extrudate. It is a further preferred embodiment to further include a dark-colored capstock of a third thermoplastic resin that is significantly transmissive of solar infrared radiation and that covers at least a portion of the structural extrusion, where the dark-colored capstock is less than about 10 thousandths of an inch thick. An alternate embodiment includes a fourth thermoplastic resin to make up portions of the structural extrusion, which can be produced with a lower cost thermoplastic resin feedstock.

It is a further object of the invention to provide a window for use in a residential or commercial structure comprising a glass pack operatively installed in a window frame, where the window frame further comprises the inventive extrudate and its embodiments described in the paragraph above.

It is a still further object of the invention to provide a method of producing the extrudate with integral foam insulation described in paragraph above, comprising feeding a first thermoplastic resin suitable for use in a structural component in the fenestration industry into a first extruder, feeding a second thermoplastic resin suitable for integrated insulation into a second extruder, outputting the first and second extruders to an extrusion die extruding the extrudate, where the extrusion die forms the structural extrusion formed of the first thermoplastic resin, suitable for use in the fenestration industry, containing at least one hollow interior portion, of a constant profile, and extending to an indefinite length, and substantially fills the hollow portion of the structural extrusion with an integrated insulation formed of the second thermoplastic resin. In a preferred embodiment, the second thermoplastic resin of the integrated insulation is foamed and shaped to further contain a plurality of air pockets running in the length of the inventive extrudate. In a still further preferred embodiment, the method comprises feeding a third thermoplastic resin that is significantly transmissive of solar infrared radiation into a third extruder and outputting the third extruder into the extrusion die so that the third thermoplastic resin forms a dark-colored capstock layer of less than about 10 thousandths of an inch thick on a surface of the structural extrusion formed of the first thermoplastic resin.

DETAILED DESCRIPTION OF THE PREFERRED EMBODIMENTS

Figure 1:
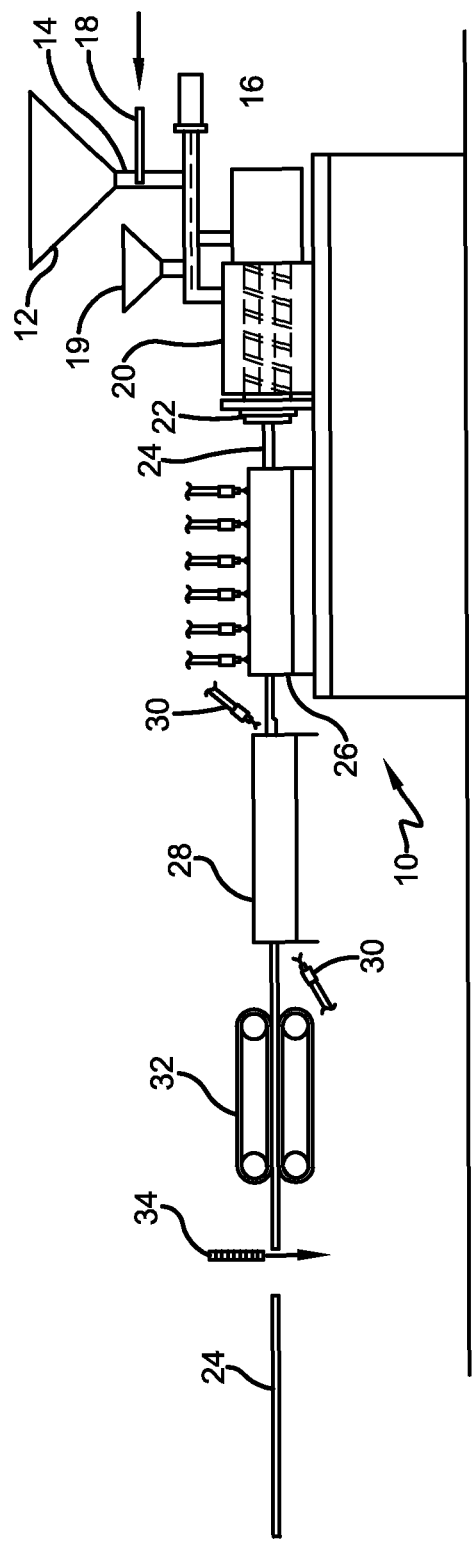
FIG. 1 is a plan view of an extrusion line of a type used with the inventive method.

The inventive extrudate comprises a structural extrusion formed of a first thermoplastic resin suitable for use in the fenestration industry and contains at least one hollow interior portion, has a constant profile, and extends to an indefinite length. An integrated insulation formed of a second thermoplastic resin substantially fills the hollow portion of the structural extrusion and in a preferred embodiment this integrated insulation is foamed and this foam further contains a plurality of air pockets running in the length of the extrudate. The first thermoplastic resin and the second thermoplastic resin are compatible and recyclable together and the structural extrusion and the integrated insulation are coextruded through an extrusion die to form the inventive extrudate. It is a further preferred embodiment to further include a dark-colored capstock of a third thermoplastic resin that is significantly transmissive of solar infrared radiation and that covers at least a portion of the structural extrusion, where the dark-colored capstock is less than about 10 thousandths of an inch thick and more preferably between 4 and 8 thousandths of an inch thick. An alternate embodiment includes a fourth thermoplastic resin to make up portions of the structural extrusion.

The method of producing the extrudate with integral insulation described in paragraph above, requires the use of a plastics extrusion line and comprises feeding a first thermoplastic resin suitable for use in a structural component in the fenestration industry into a first extruder, feeding a second thermoplastic resin suitable for integrated insulation into a second extruder, outputting the first and second extruders to an extrusion die extruding the extrudate. This extrusion die forms a structural extrusion formed of the first thermoplastic resin, suitable for use in the fenestration industry, containing at least one hollow interior portion, of a constant profile, and extending to an indefinite length, and substantially fills a hollow portion of the structural extrusion with an integrated insulation formed of a second thermoplastic resin. In a preferred embodiment, the second thermoplastic resin of the integrated insulation is foamed and shaped to further contain a plurality of air pockets running in the length of the inventive extrudate. In a still further preferred embodiment, the method comprises feeding a third thermoplastic resin that is significantly transmissive of solar infrared radiation into a third extruder and outputting the third extruder into the extrusion die so that the third thermoplastic resin forms a dark-colored capstock layer of less than about 10 thousandths of an inch thick and more preferably between 4 and 8 thousandths of an inch thick on a surface of the structural extrusion. A further alternate embodiment may include a fourth thermoplastic resin output by a fourth extruder to make up portions of the structural extrusion, such as portions of the structural extrusion that are not subject to the elements, or portions of the structural extrusion that would not typically be visible when the inventive extrusion has been manufactured into a window for use in a residential or commercial structure. In such a case, the fourth thermoplastic resin could be less costly perhaps due to not requiring additives for UV stability such as TiO$_2$ or due to loosened requirements for color uniformity or otherwise.

In addition to the various extruders discussed above, appropriate calibrators, pullers and saws are needed for the production of the above described inventive extrusions and method. Additionally, stresses imparted during the extrusion calibration process may affect the apparent color of the pigment systems of the preferred embodiments including the dark-colored capstock layer. Thus, the present invention also embodies a means to eliminate those stresses, and therefore provide a consistent visual color, by applying heat after the product exits the extruder calibrator.

Tailoring the heat build-up performance of an extrusion is conducted by essentially three means. First, the thickness of the dark-colored capstock is manipulated to minimize IR absorbance as NIR initially passes through the dark-colored capstock and as it is reflected off of the substrate back through the dark-colored capstock. This manipulation must also be done in a manner that preserves the visual color of the capstock. Second, the substrate is manipulated to provide the requisite IR reflectance, most commonly by manipulating the loading of TiO2 but also with consideration of other substrate constituents. Third, the pigments in the dark-colored capstock required to impart particular colors should be optimized to minimize their absorbance of NIR. In practice, all three means must be optimized for a particular capstock/color/substrate combination to yield a functional final product.

A preferred and useful pigment and cap material combination for the dark colored capstock material is available from Lanier Color Company and can be shown to posses the IR and weatherability properties desired, namely that the pigment system is substantially transmissive of NIR and such a pigment system is used in the inventive examples discussed, hereinbelow. The body of the dark colored capstock is Kaneka Corporation's proprietary XM20, which is an extrusion grade acrylic. This acrylic has a melt index value between approximately 13 g/10 min. and 20 g/10 min. as tested using ASTM D1238 standard at 230 degrees Celsius and 3.8 kg mass. This useful Lanier pigment system uses a black base pigment that provides a suitable base to which other pigments can be added to achieve a desired particular color or chroma (e.g., forest green or bronze) as is well understood by color houses and those of ordinary skill in the art. Individual pigments may be reflective or transmissive of NIR so long as, overall, the pigment system is substantially NIR transmissive. The preferred Lanier pigment system, or a substitute that is substantially NIR transparent, would be suitable for use in the present invention and would achieve the ends of the present invention. The dark colored capstock may be solid colors or may be formed into wood grains or other finishes with textured appearances. Further, touch-up paints that are substantially NIR transparent based on similar NIR transmissive pigment systems may be used to repair minor scratches or gaps in the dark colored capstock such as may occur at the corner welds in a window frame.

The inventor believes that PVC lineals currently used in residential window frames would likely be a suitable structural extrusion for this invention. A suitable formulation for the integrated insulation is shown in Table 1, below.

TABLE 1

| Ingredient | Supplier | Parts Per Hundred Resin (by weight) |
|---|---|---|
| PVC Resin | SE-650 - Shintech | 100.0 |
| Tin Butyl Stabilizer | RT4458 - Reagens | 1.2 |
| Ester Base Lubricant | SA 0817B - Strucktol | 1.5 |
| Acrylic Modifier | PA 40 - Kaneka | 20.0 |
| CaCO3 Filler | Optifil JS - JM Huber | 6.0 |
| CBA Pigment | 473LD - KibbeChem | 5.0 |
| | Total Parts | 133.7 |

To this formulation, a person of ordinary skill in the art would typically add a suitable blowing agent in an amount sufficient to achieve a density preferably below 0.4 g/cc and more preferably between 0.2 and 0.4 g/cc. The amounts and type of blowing agent is determined by the extrusion equipment used, the process conditions, and the particular shape and details of a particular extrusion as is well understood by those of ordinary skill in the art. The inventor has in the past used Color Matrix "Foamazol F-92" product as a blowing agent.

FIG. 1 illustrates an extrusion line 10 suitable for practicing the inventive process. An extrusion line suitable for use in an embodiment of the inventive process is disclosed in The extrusion line 10 consists of at least two extruders including primary extruder 20 (first extruder) that includes a feed hopper 12 that drops into a feed column 14 which further connects to a pre-mixer 16. Port 18 also feeds into feed column 14 for the addition of micro ingredients such as a blowing agent. Alternatively, such micro ingredients can be added at hopper 19 directly into the premixer 16. The ingredients that reach premixer 16 are fed directly into the mouth of primary extruder 20. A integrated insulation extruder (second extruder) and, in a preferred embodiment a dark colored capstock extruder (third extruder), and in a still further embodiment an alternative structural extrusion extruder (fourth extruder) having essentially these same features as described above for the primary extruder are further disclosed.

A multi-plate extrusion die 22 is further described below with reference FIG. 2, but multi-plate extrusion die 22 is operatively attached to the primary extruder 20 the output of the primary extruder 20. The extrusion is shown at reference numeral 24 after it has exited multi-plate extrusion die 22. Extrusion 24 then enters calibrator 26 which is of the ordinary type used in plastic profile extrusion and which includes sizer plates which form extrusion 24 into its final form and spray nozzles to cool and solidify extrusion 24.

After extrusion 24 exits calibrator 26, it enters heat treatment tube 28. Heat treatment tube 28 may be formed of PVC pipe approximately three feet long and of a diameter to allow easy clearance for extrusion 24 to pass through it. Preferably, at the entrance and exits of heat treatment tube 28, leister heaters 30 blow hot air into the tube and over extrusion 24. Alternatively, the heat treatment tube 28 can also be served by an IR heating tube to heat the exterior surface of extrusion 24. Further, the leister heaters 30 could be replaced with heat guns, IR heaters, radiant heaters or other devices that would heat the interior of the heat treatment tube 28 and thereby heat the surface of extrusion 24. The heat treatment tube 28 could be replaced with just Liester® heaters 30 or their substitutes that were noted above should bow of extrusion 24 not be a significant concern. It should be understood that heat treatment tube 28 is used only as necessary to correct for bow or to correct for surface color issues as has been described below and, thus, may not always be used. Extrusion 24 then continues on to puller 32 and saw 34 that are entirely conventional extrusion equipment long in use in the art.

One purpose for the heat treatment tube 28 is to eliminate the occurrence of "streaking" in the dark colored capstock where upon inspection, there will be streak of a differing shade in a line traveling down the length of extrusion 24 and it should be understood that heat treatment tube 28 or its substitutes would not be needed should there be no color streaking. This streaking is believed to be caused by stresses formed in the surface of the dark colored capstock by the calibration and cooling process which of necessity causes the surface of the dark colored capstock to contact the interior surface of calibrator 26 and causes the part to cool most quickly on the surface and, more gradually, for the interior portions of the extrusion to cool relatively more slowly. This streaking most typically is of a red shade. This streaking can be easily removed by heat treatment of the surface of dark colored capstock and the use of the heat treatment tube, as described above, heats the entire surface of extrusion 24 thus avoiding causing extrusion 24 to bend or bow as can be caused by heating only one side of the extrusion such as by directly blowing hot air onto a surface of extrusion 24. Heating the surface of extrusion 24 to approximately 145 .degree. F. to 150 .degree. F. will remove the color streaking observed in the dark colored cap disclosed herein and has found that Leister heaters 30 blowing air at approximately 225 .degree. F. into the tube has raised the surface of examples of extrusion 24 to the desired 145 .degree. F. to 150 .degree. F.

Figure 2:
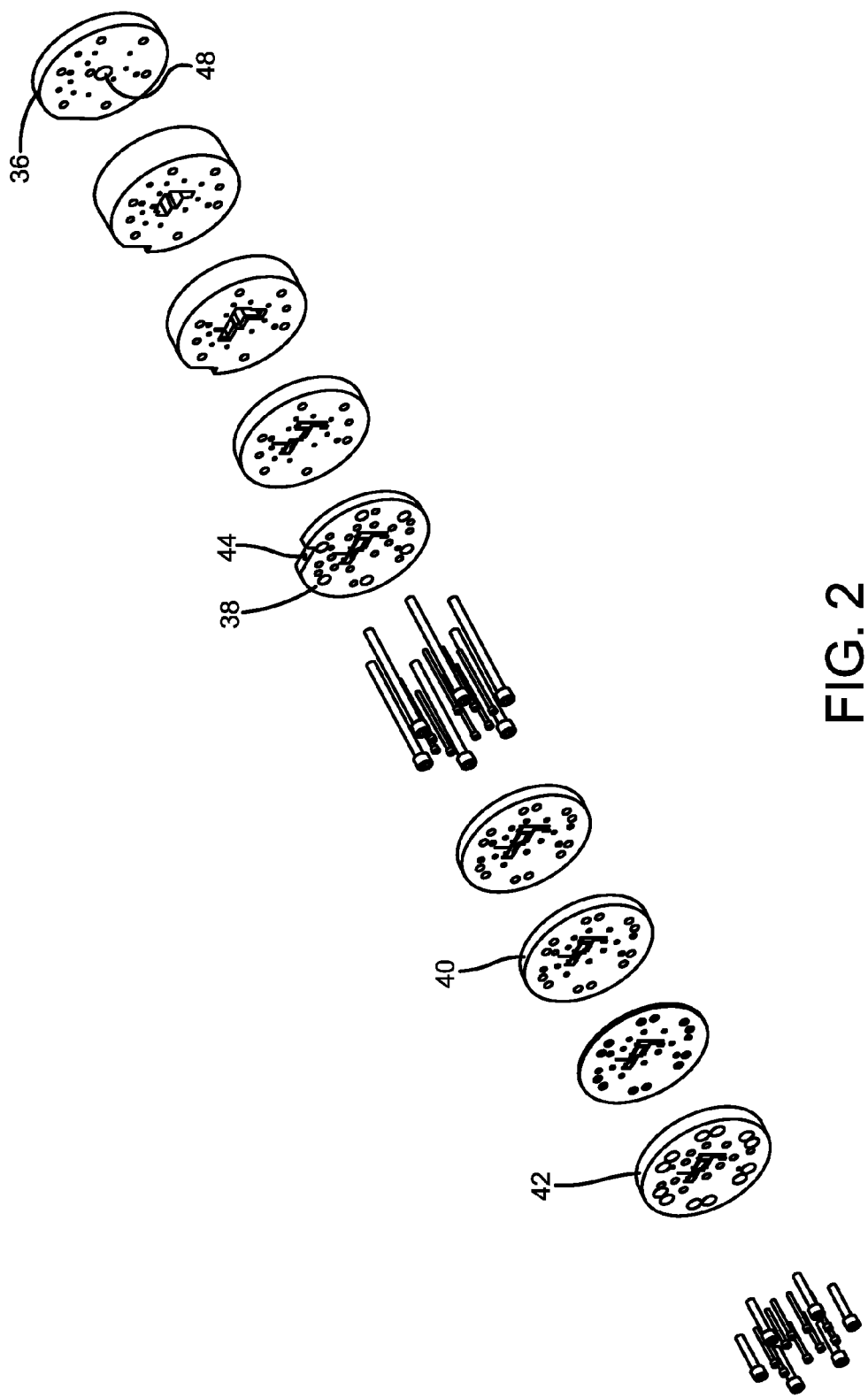
FIG. 2 is an exploded view of downstream side of a multi-plate extrusion die for use in a preferred embodiment of the inventive method.

FIG. 2 is an exploded view of the downstream sides of the individual plates of the multi-plate extrusion die 22 for use in a preferred embodiment of the inventive method. FIG. 2 illustrates a multi-plate die assembly 22 shown in exploded form consisting of individual die plates 36, 38, 40, and 42 and various intermediate plates connecting the same for manufacturing the inventive extrudate. The manner of use of such dies is well known to those of ordinary skill in the thermoplastic extrusion art. Nevertheless, it is sufficient to state that the multi-plate die assembly 22 shown in FIG. 2 is intended for use with a plurality of conventional extruders, such as conventional twin screw extruders, each of which includes a mixer or hopper for accepting a thermoplastic resin feed stock, a conduit for connecting the hopper with a preheater for controlling the temperature of an admixture of the feed stock in the hopper, in the case of the second thermoplastic resin used for the integrated insulation, optionally an inlet for introducing foaming agents for a foamed component. The multi-screw chamber of each extruder is connected to an appropriate input on the die assembly plates shown in FIG. 2 for producing an embodiment of the extrudate with integrated insulation.

As best seen in FIG. 2, one of the hereinabove described extruders (not shown) is fluidly connected to an introductory plate 36 for introduction of a first thermoplastic resin for forming the structural extrudate through the multi-plate die assembly 22. FIGS. 3, 4, 5, and 6 show the flow of the first thermoplastic resin for forming the structural extrudate and the flow of the second thermoplastic resin forming the integrated insulation as practiced with a hollow, thin-walled PVC extrudate.

Figure 3:
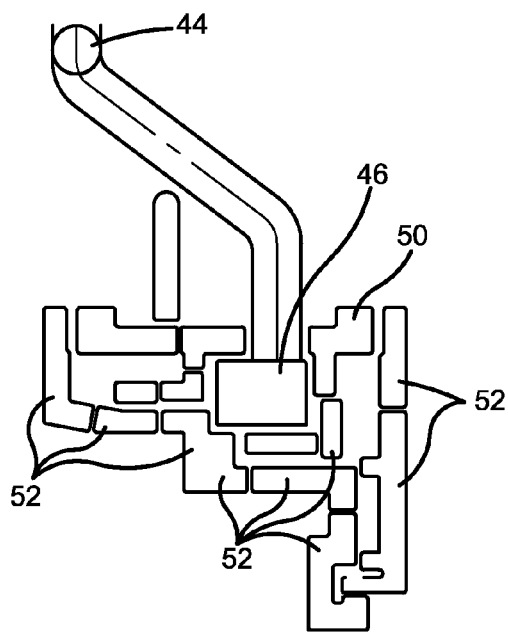
FIG. 3 is a view of the flow of the various thermoplastic resin feed stocks in one of the plates of the multi-plate extrusion die shown in FIG. 2.

Flow at approximately the midpoint within plate 38 of the multi-plate die assembly 22 is shown at FIG. 3. Inlet 44 for introducing the second thermoplastic resin suitable for integrated insulation 46, a suitable formulation for such shown in Table 1, from the output of second extruder and the inlet 48 for the first thermoplastic resin for the structural extrusion 50, 52 is shown in FIGS. 2 and 3. As was described above, portions of the structural extrusion may consist of a fourth thermoplastic resin of lower cost and could be fed through to 50 in this exemplary extrusion from a fourth extruder from an un-shown inlet in a similar manner to inlet 44. The portions of the structural extrusion at 52, or all of the structural extrusion 50, 52, are fed through inlet 48 of the multi-plate die assembly 22 from the output of the first extruder. The multiple channels flowing the structural extrusion 50, 52 are shaped to help equalize the flow and to allow the insertion of the integrated insulation 46 within the interior of structural extrusion 50, 52.

Figure 4:
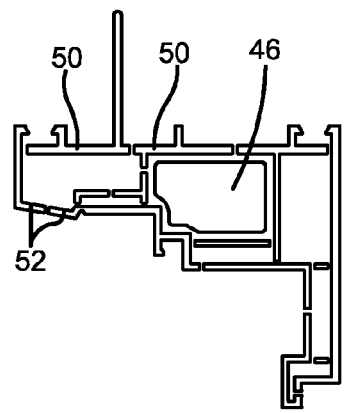
FIG. 4 is a view the flow of the various feed stocks in one of the plates of the multi-plate extrusion die shown in FIG. 2.

Flow at approximately the midpoint within plate 40 of the multi-plate die assembly 22 (shown in FIG. 2) is shown at FIG. 4. The structural extrusion 50, 52 is much closer to shape of its intended final form. The intended integrated insulation 46 can be seen in the interior of structural extrusion 50, 52.

Figure 5:
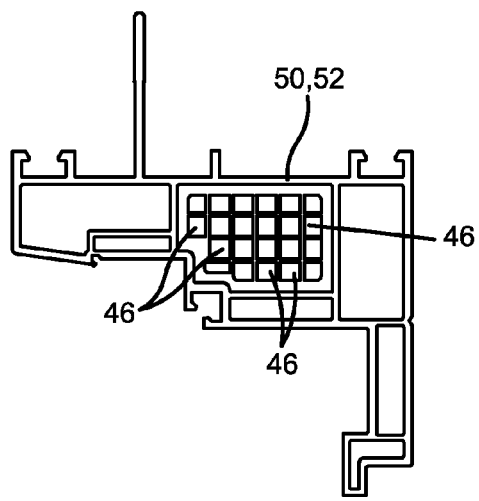
FIG. 5 is a view of the flow of the various feed stocks in one of the plates of the multi-plate extrusion die shown in FIG. 2.
Figure 6:
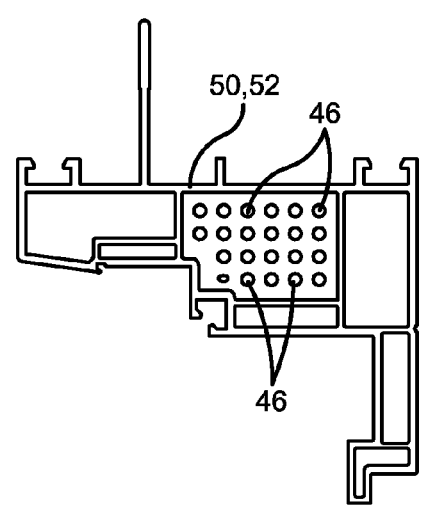
FIG. 6 is a view the flow of the various feed stocks in one of the plates of the multi-plate extrusion die shown in FIG. 2.
Figure 10:
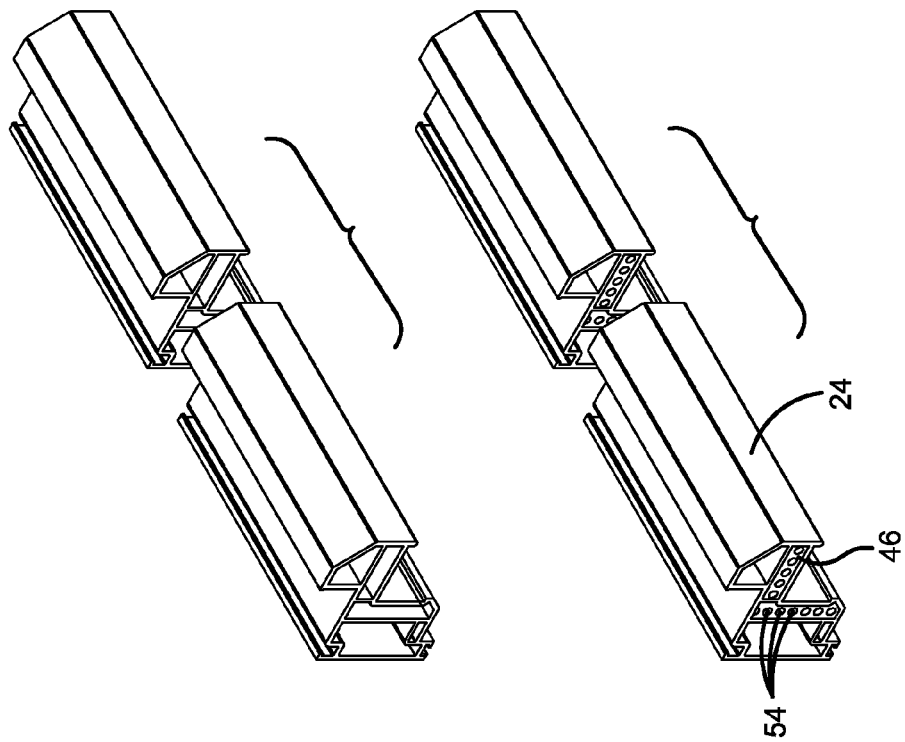
FIG. 10 are top right perspective views, which are broken in the center indicating indefinite length, of another example of a preferred embodiment of the inventive extrusion showing the inventive extrusion with and without the inventive integrated insulation.
Figure 9:
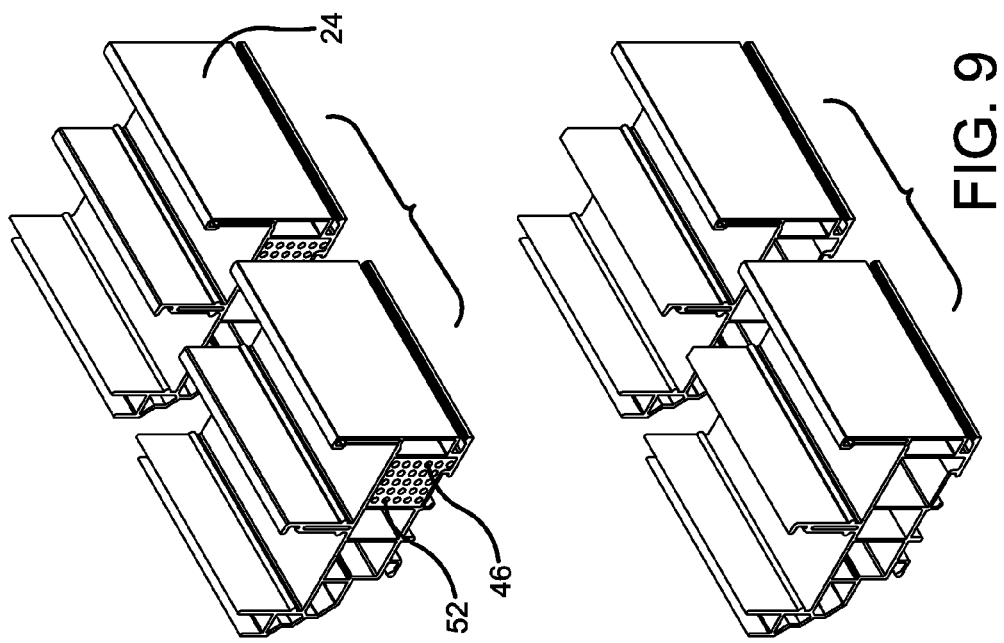
FIG. 9 are top right perspective views, which are broken in the center indicating indefinite length, of an example of the preferred embodiment of the inventive extrusion, showing the extrusion with and without the inventive integrated insulation.

The entrance to plate 42 of the multi-plate die assembly 22 (shown in FIG. 2) is shown at FIG. 5 for the preferred embodiment of integrated insulation 46. The exit of plate 42 of the multi-plate die assembly 22 (shown in FIG. 2) is shown at FIG. 6 for the preferred embodiment of integrated insulation 46. The typical preferred final shape of the preferred embodiment of integrated insulation 46 is shown in two different window component extrusions at FIGS. 9 and 10. The integrated insulation 46 is broken up into a group of "ribbons" or "strands" beginning at the entrance to plate 42 shown at FIG. 5. At the exit to plate 42, shown at FIG. 6, integrated insulation 46 is twenty-two individual stands of the second thermoplastic resin. Note that the integrated insulation may easily be left out of the extrusion to save costs, where such performance is not needed, merely by not adding the second extruder. This allows the option of a less costly extrusion without integrated insulation without adding further die or tooling costs.

In this preferred embodiment, the individual stands of the integrated insulation 46 expand due to the blowing agent and due to the lower pressure at the exit of multi-plate die assembly 22 at plate 42, best seen in FIG. 6. In the preferred embodiment, the individual stands of the integrated insulation 46 expand until they crowd together and mesh together where they meet while leaving a series of air pockets 54 running the length of the extrudate with integrated foam insulation. If the flow of the integrated insulation 46 is too high or the foam is too aggressive, then the strands will push tightly together leaving no air pockets.

Figure 7:
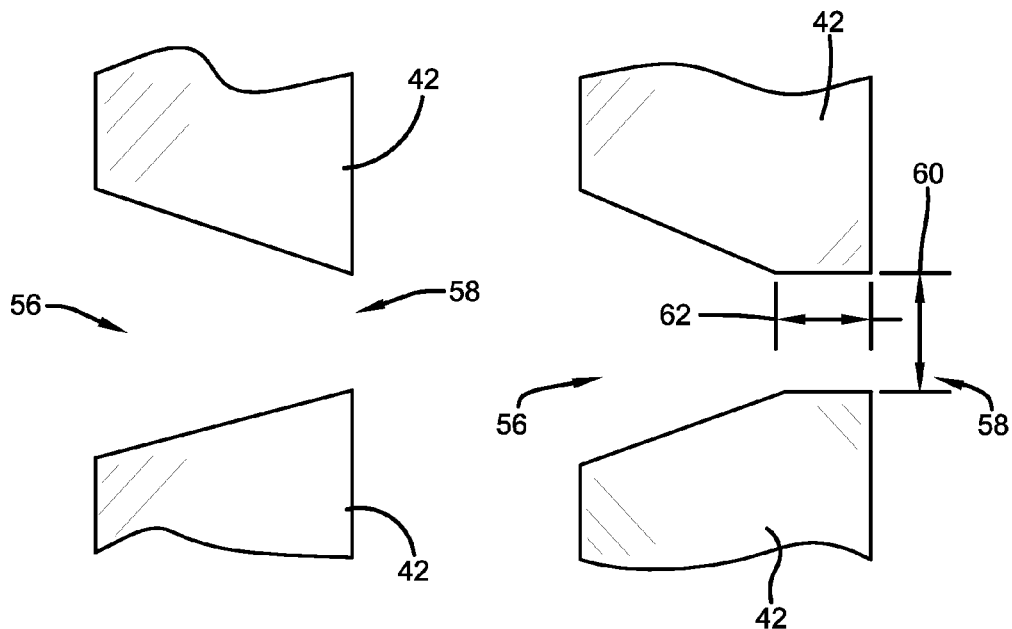
FIG. 7 is a cut-away view of a two possible die orifices for use in one of the plates of the multi-plate extrusion die shown in FIG. 2.

FIG. 7 shows cut-away partial side views of the possible interior views of plate 42 of the multi-plate die assembly 22. The entrance side is shown on the left at 56 and the exit shown at 58 showing the flow of an individual strand of integrated insulation 46 through plate 42 where the size of the exit orifice is preferably between 0.08 and 0.10 inches shown at 60 and where the orifices are typically spaced between 0.08 and 0.10 inches apart and from a wall of the structural extrusion 50, 52. The left-hand version shown is typically referred to as "free-foam" version allowing the maximum flow of an individual strand of the integrated insulation 46. The right hand version has a die land 62 which is a parallel portion of walls of the die. Such a die land 62 will serve to increase the drag on the individual strand of the integrated insulation 46 reducing the flow rate through plate 42. By shortening the die land 62, one can increase the flow of an individual strand of the integrated insulation 46 allowing "tuning" of the multi-plate die assembly 22 to allow the formation and retention of the air pockets 54 seen in FIGS. 9 and 10.

Inventor has found that individual strands of the integrated insulation 46 that exit plate 42 of the multi-plate die assembly 22 through orifices between 0.08 and 0.10 inches and spaced between 0.08 and 0.10 inches apart typically need a die land of 0.05 to 0.2 inches. The angle of the orifice prior to the die land has not been found to be critical.

Figure 8:
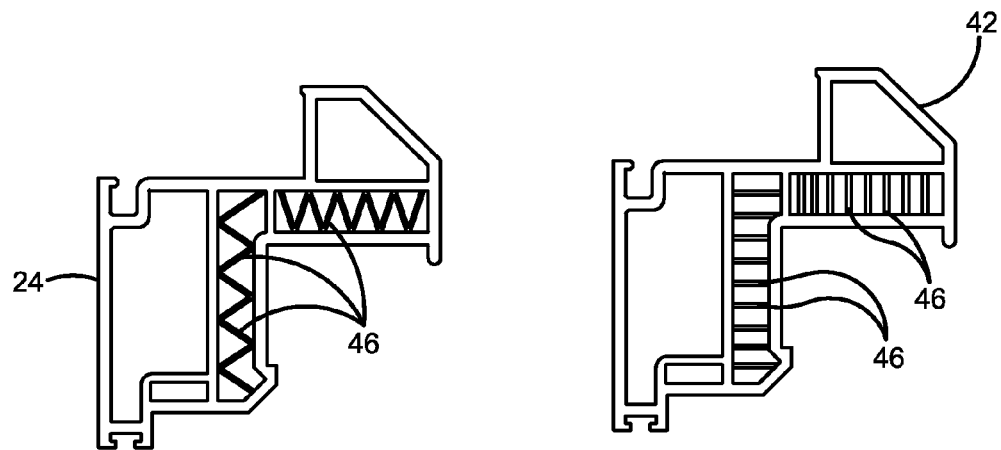
FIG. 8. is a view of the inventive extrusions showing profiles showing alternate embodiments of the integrated insulation.

FIG. 8 shows two alternate embodiments of possible integrated insulation 46. Instead of extruding individual strands that partially merge together leaving air pockets, here, the orifices in the die plate would be narrow slots. These slots can be arranged to allow multiple air pockets and low overall density of the integrated insulation 46.

The structural extrusion 50, 52 and the integrated insulation can be easily recycled by grinding up the extrusions as with a standard, hollow PVC extrusion, while using an aspirator on the ground materials to substantially remove the substantially lower density integrated insulation. The recycled and substantially uniform structural extrusion materials can then be reused in the extrusion process.

The integrated insulation 46 of the inventive process and extrudate substantially match or exceed commercially available polyethylene and polyurethane insulation products. As such, the windows made with the inventive extrudate and triple pane glass packs have tested to a 0.15 U-factor/R6.5 window substantially exceeding current EnergyStar® requirements of a 0.3 U-factor. The manufacturing of the inventive extrudate into a completed window does not require any additional or changed fabrication steps from standard hollow PVC window, while offering substantially better performance.

The invention claimed is:

1. A method of co-extruding an insulated extrudate with a plurality of integral foamed insulating strands, the method comprising the steps of:
   feeding a first thermoplastic resin suitable for use in a structural fenestration component into a first extruder;
   feeding a second thermoplastic resin suitable for integrated insulation into a second extruder; and
   outputting the first and second extruders to an extrusion die and extruding the extrudate from the extrusion die, where the extrusion die forms a structural fenestration extrusion formed of the first thermoplastic resin and wherein the structural fenestration extrusion defines at least one hollow interior portion of a constant profile, and, wherein the extrusion die substantially fills the hollow interior portion of the structural extrusion with an integrated insulation formed of a plurality of strands of foamed second thermoplastic resin that crowd together to define a plurality of air pockets running in a length of the extrudate between the strands while also integrating with the structural extrusion to define an integrated insulating extrudate.

2. The method of claim 1, wherein the plurality of air pockets of the integrated insulation running in the length of the extrudate are formed by the extrusion die with a plurality of individual outlets having a die land between 0.05 and 0.2 inches.

3. The method of claim 1, further comprising the step of feeding a third thermoplastic resin that is significantly transmissive of solar infrared radiation into a third extruder and outputting the third extruder into the extrusion die so that the third thermoplastic resin forms a dark-colored capstock layer of less than about 10 thousandths of an inch thick on a surface of the structural extrusion formed of the first thermoplastic resin.

4. The method of claim 3, wherein the extrusion die forms the dark-colored capstock portion into a layer less than about 8 thousandths of an inch thick and the first thermoplastic resin contains between about 8 and 11 parts titanium dioxide per hundred base resin.

5. A method of coextruding an insulated extrudate with integral foamed insulating strands, the method comprising the steps of:
   extruding a first resin to define a fenestration structure to be insulated; the fenestration structure having a longitudinal direction;
   extruding a second resin as a plurality of foamed strands disposed within the fenestration structure;
   allowing the foamed strands to expand and crowd together within the structure to be insulated to define a plurality of longitudinal air pockets disposed within the fenestration structure and between the foamed strands; and integrating at least some of the foamed strands to the fenestration structure to form an integral insulated structure.

6. The method of claim 5, further comprising the step of selecting the first resin and the second resin to be recyclable together.

7. The method of claim 6, further comprising the step of selecting the first resin and the second resin to be resins comprised of polyvinyl chloride.

8. The method of claim 5, further comprising the step of extruding the first and second resins from the same extrusion die.

9. The method of claim 8, further comprising the step of forming the foamed strands and longitudinal air pockets with an extrusion die having a plurality of outlets having a die land between 0.05 and 0.2 inches.

10. The method of claim 9, further comprising the step of substantially filling the fenestration structure with the expanded foamed strands.

11. The method of claim 9, further comprising the step of adding a blowing agent to the second resin to achieve a density below 0.4 g/cc.

* * * * *